(12) United States Patent
Jensen et al.

(10) Patent No.: US 9,669,784 B2
(45) Date of Patent: Jun. 6, 2017

(54) VEHICLE ENERGY MANAGEMENT SYSTEM WITH LOAD-BEARING COMPONENT IN WHEEL CAVITY

(71) Applicant: GM GLOBAL TECHNOLOGY OPERATIONS LLC, Detroit, MI (US)

(72) Inventors: Charles E. Jensen, Shelby Township, MI (US); Robert N. Saje, Shelby Township, MI (US); Matthew P. Simonin, Ortonville, MI (US); Jonathan E. Rich, Clinton Township, MI (US); Michael E. Quigley, Washington Township, MI (US); Hans P. Lawall, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 89 days.

(21) Appl. No.: 14/678,480

(22) Filed: Apr. 3, 2015

(65) Prior Publication Data

US 2016/0288747 A1 Oct. 6, 2016

(51) Int. Cl.
  *B60R 19/00* (2006.01)
  *B62D 21/15* (2006.01)
  *F15B 15/19* (2006.01)
  *B60R 13/08* (2006.01)

(52) U.S. Cl.
  CPC .......... *B60R 19/00* (2013.01); *B60R 13/0861* (2013.01); *B62D 21/152* (2013.01); *F15B 15/19* (2013.01); *B60R 2019/007* (2013.01)

(58) Field of Classification Search
  CPC .............. B60R 19/00; B60R 2019/002; B60R 2019/005; B60R 2019/007; B60R 99/00; B60R 21/36; B60R 2021/23176
  USPC ...................... 267/119, 120; 293/8
  See application file for complete search history.

(56) References Cited

U.S. PATENT DOCUMENTS

| | | | | |
|---|---|---|---|---|
| 6,296,298 B1 * | 10/2001 | Barz | .................... | B62D 29/002 |
| | | | | 296/187.02 |
| 6,866,115 B2 * | 3/2005 | Miyasaka | ............... | B60R 19/00 |
| | | | | 180/311 |
| 7,900,995 B2 * | 3/2011 | Sato | ...................... | B62D 21/152 |
| | | | | 280/784 |
| 8,002,312 B2 * | 8/2011 | Korechika | .............. | B60R 21/02 |
| | | | | 180/274 |
| 9,004,216 B1 * | 4/2015 | Baccouche | ............. | B60R 21/36 |
| | | | | 180/274 |
| 9,067,469 B2 * | 6/2015 | Asjad | .................... | B62D 21/152 |
| 9,156,418 B2 * | 10/2015 | Ramoutar | ............... | B60R 19/24 |
| 9,394,005 B1 * | 7/2016 | Enders | ................. | B62D 21/152 |
| 9,527,466 B2 * | 12/2016 | Kalandek | ................ | B60R 19/00 |
| 2002/0008375 A1 * | 1/2002 | Iyanagi | ................ | B62D 21/152 |
| | | | | 280/784 |
| 2005/0218696 A1 * | 10/2005 | Aase | ....................... | B60R 19/00 |
| | | | | 296/187.02 |

(Continued)

*Primary Examiner* — Barry Gooden, Jr.
(74) *Attorney, Agent, or Firm* — Quinn IP Law (57) ABSTRACT

An energy management system for a vehicle includes a load-bearing component operatively positioned in a wheel cavity rearward of a tire and wheel assembly in the wheel cavity. The load-bearing component is configured to limit movement of the tire and wheel assembly in the wheel cavity under a load applied to the vehicle forward of the tire and wheel assembly and offset from a longitudinal centerline of the vehicle.

9 Claims, 8 Drawing Sheets

(56) References Cited

U.S. PATENT DOCUMENTS

| | | | |
|---|---|---|---|
| 2015/0021938 A1* | 1/2015 | Bryer | B60R 19/34 293/132 |
| 2015/0021939 A1* | 1/2015 | Bryer | B60R 19/18 293/132 |
| 2015/0175110 A1* | 6/2015 | Kalandek | B60R 19/00 180/274 |
| 2016/0001727 A1* | 1/2016 | Watterworth | B62D 21/15 280/784 |

* cited by examiner

VEHICLE ENERGY MANAGEMENT SYSTEM WITH LOAD-BEARING COMPONENT IN WHEEL CAVITY

TECHNICAL FIELD

The present teachings generally include a vehicle energy management system with a load-bearing component in a wheel cavity.

BACKGROUND

Vehicles are often equipped with various components configured to manage the energy of an applied force. For example, a bumper may be attached to frame rails to manage energy applied to the bumper.

SUMMARY

An energy management system for a vehicle includes a load-bearing component operatively positioned in a wheel cavity rearward of a tire and wheel assembly in the wheel cavity. The load-bearing component is configured to limit movement of the tire and wheel assembly within the wheel cavity under a load that is applied to the vehicle forward of the tire and wheel assembly and offset from a longitudinal centerline of the vehicle.

In some embodiments, the energy management system is selectively actuatable. For example, one embodiment of an energy management system within the scope of the present teachings includes a pyrotechnic actuator assembly mounted to a longitudinally extending rocker of the vehicle. The actuator assembly includes an actuator housing forming a pyrotechnic chamber. A pyrotechnic igniter is in communication with the pyrotechnic chamber and is selectively activatable to generate a pressure impulse. The load-bearing component is an actuator configured to deploy from the actuator housing into the wheel cavity and engage the tire and wheel assembly in response to the pressure impulse. The actuator has an end effector that contacts the tire and wheel assembly. A sensor is operatively connected to the vehicle and the pyrotechnic igniter and is configured to provide a signal that activates the pyrotechnic igniter upon sensing a predetermined condition indicative of imminent or actual application of the load.

In another embodiment, the energy management system includes an airbag assembly mounted to the vehicle. The airbag assembly includes an airbag selectively deployable into the wheel cavity. The load-bearing component includes a first portion of the airbag. The airbag assembly is mounted to a longitudinally-extending rocker of the vehicle, and includes an actuator housing forming an inflation chamber. The airbag is operatively connected to the actuator housing. An inflation mechanism is in communication with the inflation chamber and is selectively activatable to inflate the airbag, such as by releasing propellant. The airbag is configured to deploy into the wheel cavity when inflated so that the load-bearing component engages the tire and wheel assembly. A sensor is operatively connected to the vehicle and to the airbag and configured to activate the inflation mechanism upon sensing a predetermined condition indicative of imminent or actual application of the load.

In another embodiment, the energy management system is passive, and the load-bearing component is a structural wheelhouse liner fixed to and lining at least a portion of the wheelhouse structure. By way of non-limiting example, the structural wheelhouse liner may be a fiber-reinforced composite, or may be a steel base plate, with a damping pad secured to the steel base plate forward of the steel base plate in the wheel cavity.

The above features and advantages and other features and advantages of the present teachings are readily apparent from the following detailed description of the best modes for carrying out the present teachings when taken in connection with the accompanying drawings.

DETAILED DESCRIPTION

Figure 1:
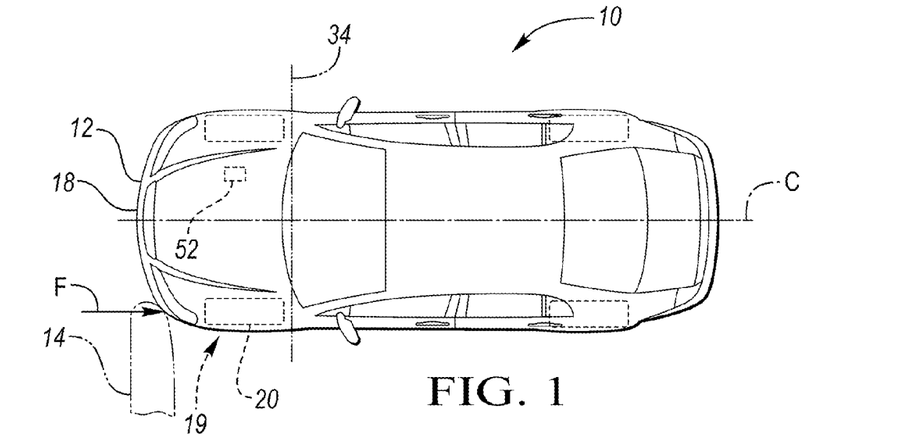
FIG. 1 is a schematic illustration in top view of a vehicle with a barrier shown in fragmentary phantom view contacting the vehicle at an offset from the center longitudinal axis of the vehicle.

Referring to the drawings, wherein like reference numbers refer to like components throughout the views, FIG. 1 shows a vehicle 10 that has a longitudinal center axis C. A front end 12 of the vehicle 10 is shown at a moment when initially contacted by a barrier 14 that is laterally offset from the center axis C. Because the barrier 14 is offset from the longitudinal center axis, a rearward-directed load F of the barrier 14, represented by a rearward arrow, is generally outboard of a longitudinally-extending frame rail 16 shown in the bottom view of FIG. 2, and initially engages only an outboard portion of a bumper 18 supported on the frame rail 16. As used herein, the term "outboard" refers to a position of a component further from the center of the vehicle 10 than an inboard position. A component is laterally-outboard relative to another component if it is further laterally from the longitudinal center axis C.

Figure 2:
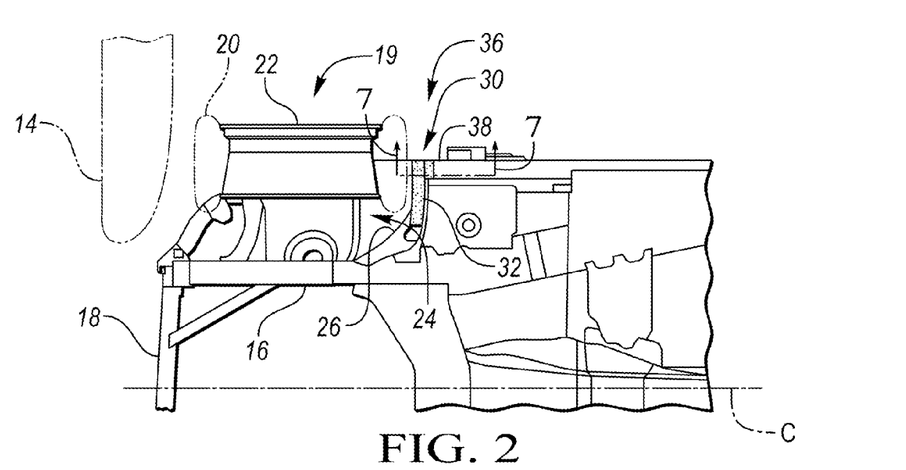
FIG. 2 is a schematic illustration in fragmentary bottom view of the vehicle and barrier of FIG. 1 and with an actuator assembly with a load-bearing component in an unactuated position.
Figure 9:
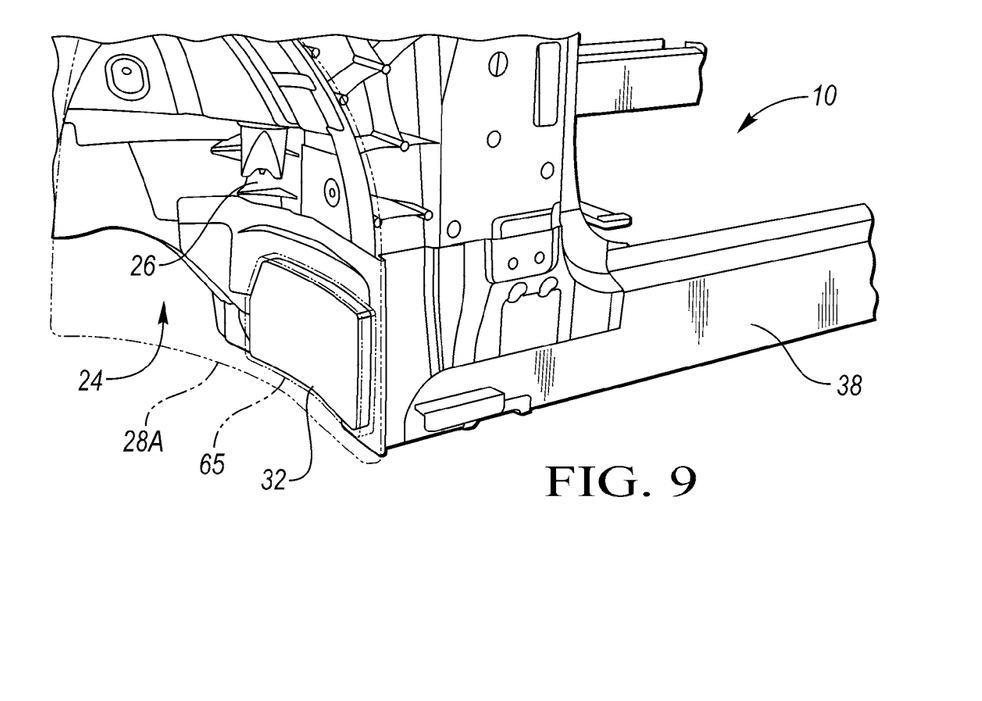
FIG. 9 is a schematic illustration in fragmentary perspective view of the vehicle of FIG. 1 with the actuator assembly of FIG. 7 in an unactuated position.
Figure 10:
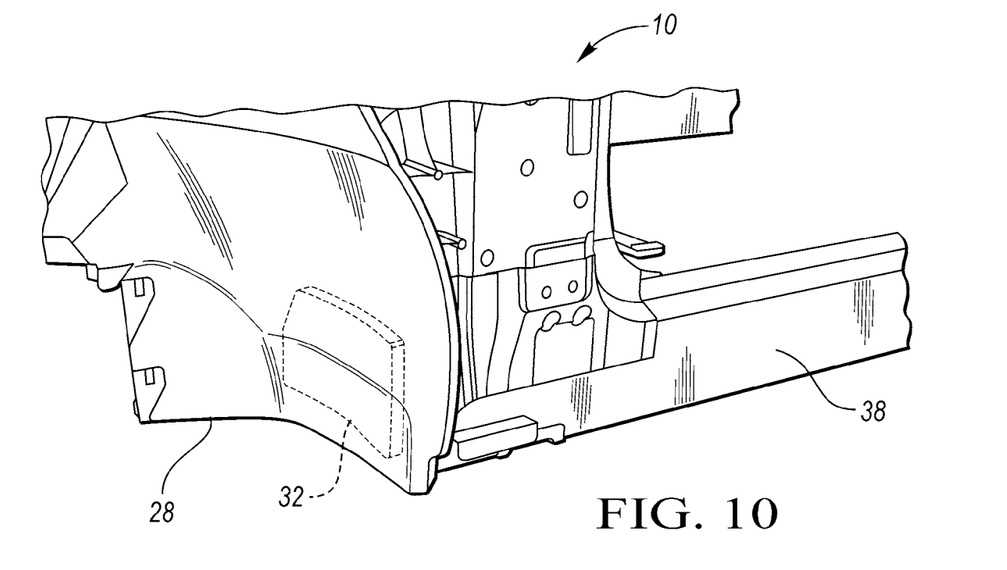
FIG. 10 is a schematic illustration in fragmentary perspective view of the vehicle of FIG. 1 with the actuator assembly of FIG. 7 in an unactuated position and with a wheelhouse liner covering an end effector of the actuator assembly.
Figure 14:
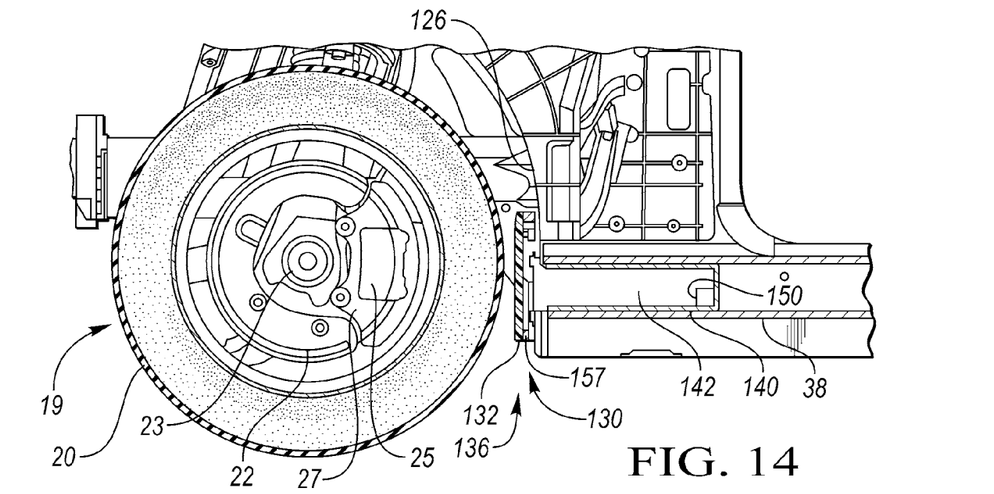
FIG. 14 is a schematic illustration in fragmentary cross-sectional view of the vehicle of FIG. 11 taken at lines 14-14 in FIG. 11.
Figure 15:
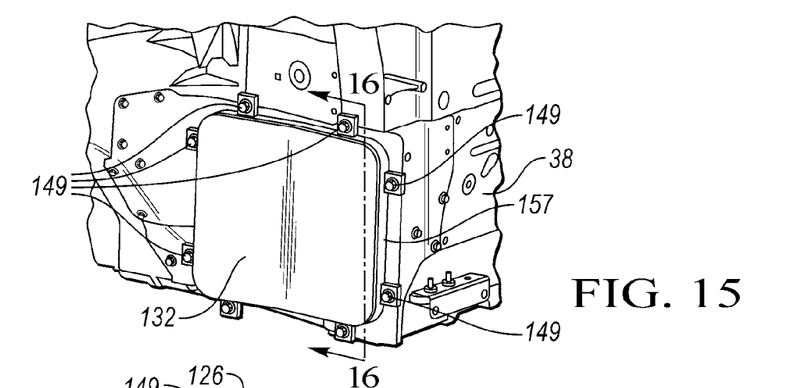
FIG. 15 is a schematic illustration in fragmentary perspective view of a portion of the vehicle of FIG. 14.

In FIG. 2, a fascia and body structure of the vehicle is removed, and the barrier 14 is shown just prior to contacting the vehicle 10. As is apparent in FIGS. 1 and 2, a tire and wheel assembly 19 is in a direct path of the barrier 14. The tire and wheel assembly 19 includes a tire 20, a wheel 22 on which the tire 20 is mounted, as well as a wheel hub 23, caliper 25, and rotor assembly 27 (shown best in FIG. 14) operatively connected to the wheel 22 as is understood by those skilled in the art. The tire and wheel assembly 19 is positioned in a wheel cavity 24 formed and defined by wheelhouse structure 26 of the vehicle 10, as best shown in FIG. 9. The wheelhouse structure 26 may include various interconnected body components of the vehicle 10, as is understood by those skilled in the art. Optionally, the wheelhouse structure 26 can be covered by a wheelhouse liner 28 as shown in FIG. 10. The wheelhouse liner 28 is secured to the wheelhouse structure 26 by any suitable means, such as with fasteners. In such an embodiment, the wheelhouse liner 28 is a non-structural wheelhouse liner. As used herein, a "structural" wheelhouse liner is a wheelhouse liner configured of a material and with a thickness sufficient to provide a load-bearing function in limiting movement of the tire and wheel assembly 19 within the wheel cavity 24 under a predetermined load F. For example, a structural wheelhouse liner may limit rearward movement of the tire and wheel assembly 19 under a predetermined load F having a magnitude of 350 kilonewtons (kN) to 400 kN). A "nonstructural" wheelhouse liner is a wheelhouse liner that does not serve a load-bearing purpose, and is of a material and thickness that is not sufficient to provide a load-bearing function, so will not limit rearward movement of the tire and wheel assembly 19 under a predetermined load F. For example, a "nonstructural" wheelhouse liner is a wheelhouse liner that can withstand a load F of only up to 5 kN. In FIG. 10, the wheelhouse liner 28 could be a relatively thin plastic material of insufficient strength to limit rearward movement of the tire and wheel assembly 19 under the predetermined load F.

Figure 3:
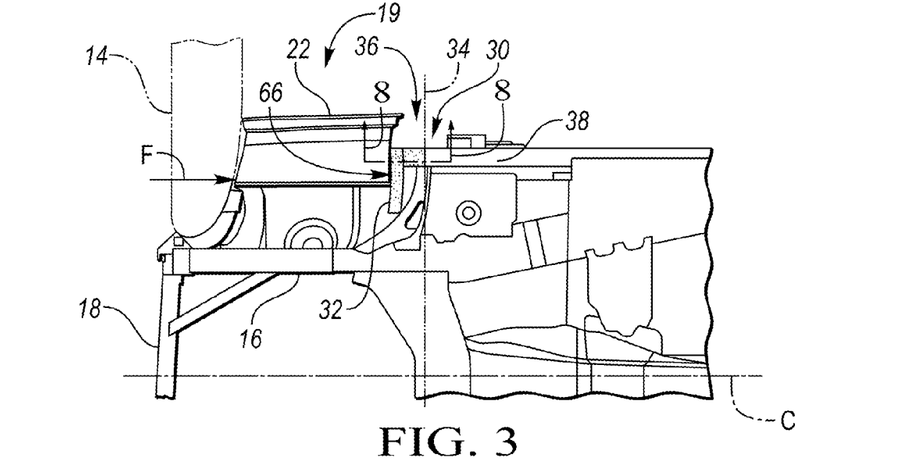
FIG. 3 is a schematic illustration in fragmentary bottom view of the vehicle of FIG. 2 with the actuator assembly in an actuated position.
Figure 4:
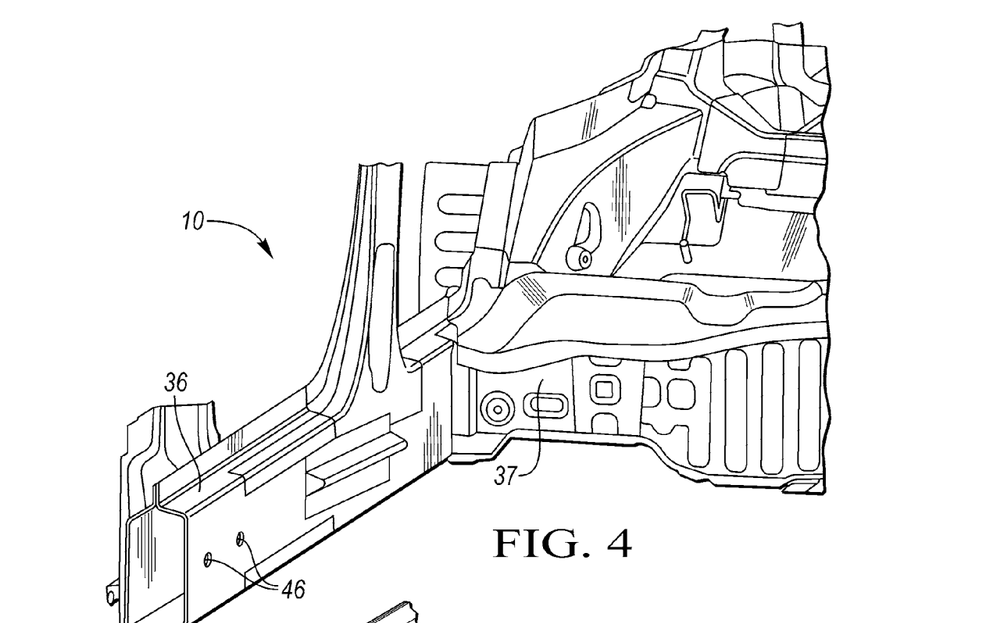
FIG. 4 is a schematic illustration in fragmentary perspective view of the vehicle of FIG. 1 including a rocker.
Figure 5:
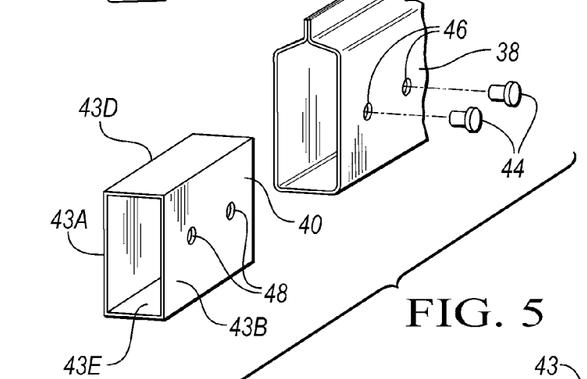
FIG. 5 is a schematic illustration in fragmentary perspective and exploded view of the rocker of FIG. 4 and an actuator housing of an actuator assembly.

The tire 20 is shown only in phantom in FIG. 2, and is not shown in FIG. 3, to represent that, under a sufficient magnitude of the load F, the tire 20 may puncture, in which case a load-bearing component 32 described herein may then engage the wheel 22. In order to limit movement of the tire and wheel assembly 19 in the wheel cavity 24 under loading by load F, the vehicle 10 has an energy management system 30 that includes the load-bearing component 32 operatively positioned in the wheel cavity 24 rearward of the tire and wheel assembly 19. The load-bearing component 32 is configured to limit movement of the tire and wheel assembly 19 rearward of the wheelhouse structure 26 under the load F. For example, the energy management system 30 with the load-bearing component 32 limits movement of the tire and wheel assembly 19 rearward of line 34 shown in FIGS. 1 and 3. Line 34 is generally perpendicular to the longitudinal center axis C and may represent a forward portion of body structure 37 shown in FIG. 4 that extends generally across a width of the vehicle 10 and may establish a forward boundary of a passenger compartment. For example, line 34 can be referred to as a dash panel, or a panel that separates a front compartment, such as an engine compartment, from a passenger compartment.

Figure 6:
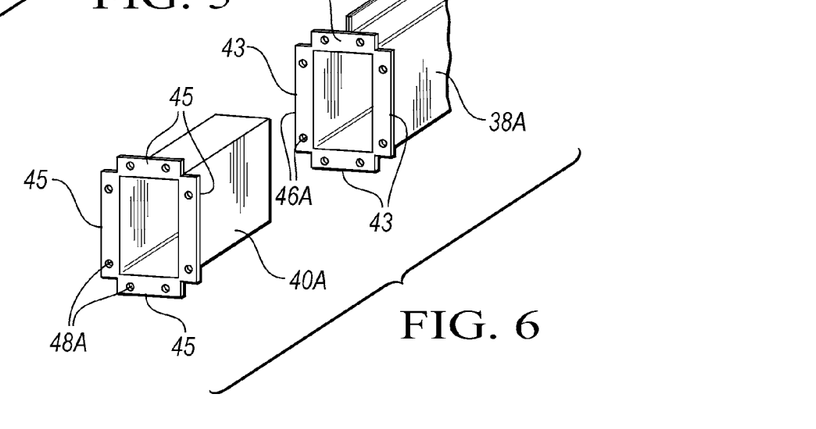
FIG. 6 is a schematic illustration in fragmentary perspective and exploded view of an alternative embodiment of the rocker of FIG. 4 and an actuator housing of an actuator assembly.
Figure 7:
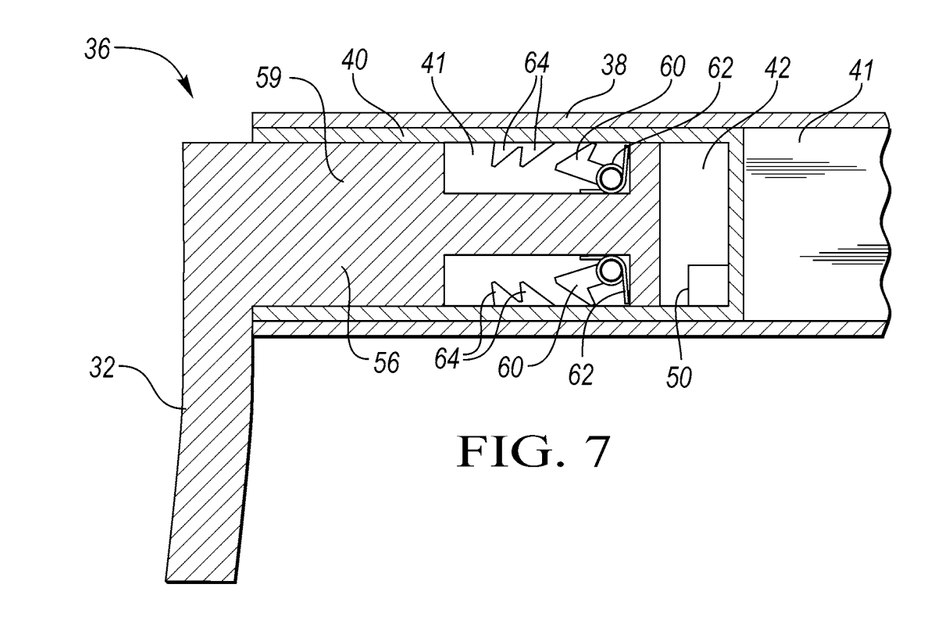
FIG. 7 is a schematic illustration in fragmentary cross-sectional view of the rocker and actuator assembly of FIG. 2 taken at lines 7-7 in FIG. 2.
Figure 8:
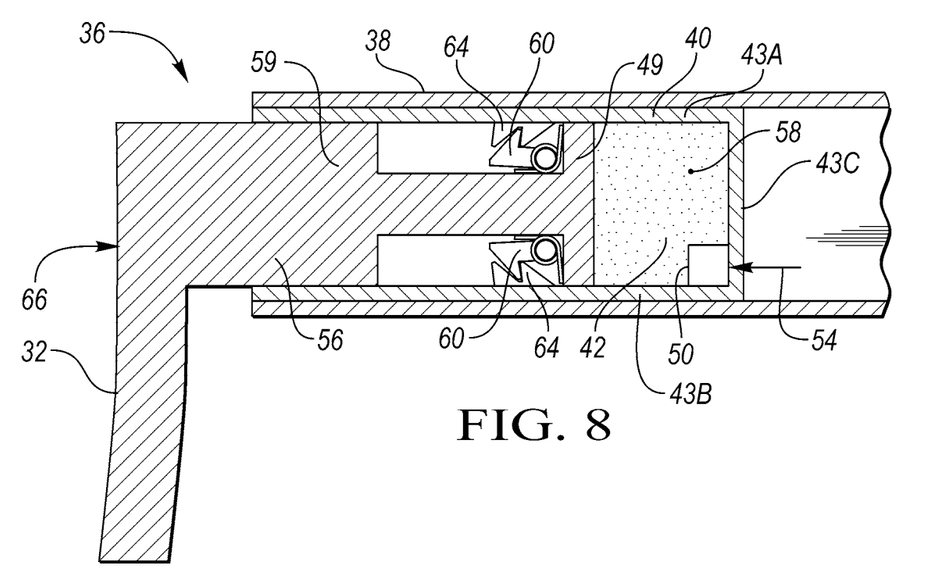
FIG. 8 is a schematic illustration in fragmentary cross-sectional view of the rocker and actuator assembly of FIG. 3 taken at lines 8-8 in FIG. 3.

In the embodiment of FIGS. 1-5 and 7-8, the energy management system 30 includes a pyrotechnic actuator assembly 36 mounted to a longitudinally-extending rocker 38 of the vehicle 10. As best shown in FIGS. 7 and 8, the pyrotechnic actuator assembly 36 includes an actuator housing 40 forming a pyrotechnic chamber 42. The actuator housing 40 fits inside of an internal cavity 41 formed by the hollow rocker 38. The housing 40 can be secured to the rocker 38 with bolts 44 or other fasteners that extend through spaced openings 46 in the rocker 38 and spaced openings 48 in the housing 40 that align with the openings 46 in the rocker 38 when the housing 40 is installed within the hollow rocker 38. The bolts 44 and openings 46, 48 can be threaded and nuts (not shown) can be used to secure the bolts 44. In an alternative embodiment shown in FIG. 6, an alternative rocker 38A can have flanges 43 at a forward end that mate with flanges 45 at a forward end of an alternative actuator housing 40A. Bolts or other fasteners can extend through openings 46A of the rocker 38A that align with openings 48A of the housing 40A.

With reference to FIG. 7, the pyrotechnic actuator assembly 36 includes a pyrotechnic igniter 50 in electric communication (by wires) or wireless signal communication with one or more sensors 52 mounted in the vehicle 10, as shown in FIG. 1. The sensor 52 may be an accelerometer, a pressure sensor, a wheel speed sensor, a brake pressure sensor, or other sensor configured to sense a predetermined vehicle condition indicative of imminent or actual application of the load F to the vehicle 10, as is understood by those skilled in the art. The sensor 52 is configured to provide a signal 54 (shown in FIG. 8) to the pyrotechnic igniter 50 upon sensing the predetermined vehicle condition. The signal 54 activates the pyrotechnic igniter 50, causing the pyrotechnic igniter 50 to generate a pressure impulse in the pyrotechnic chamber 42 as indicated by propellant 47. The pyrotechnic chamber 42 is bounded and enclosed by walls 43A, 43B, 43C of the actuator housing 40, and by a rear wall 49 of an actuator 56 that includes load-bearing component 32. Additional spaced walls 43D, 43E of the actuator 40 shown in FIG. 5 further enclose the chamber 42. The actuator 56 is configured to deploy from the actuator housing 40 in response to the pressure impulse in the chamber 42. In other words, the actuator 56 moves relative to and extends from the actuator housing 40 when actuated. FIG. 7 shows the actuator 56 in an unactuated, undeployed position, and FIG. 8 shows the actuator 56 moved to an actuated, deployed position following activation of the igniter 50. The pressure impulse is represented by gas 58 released into the chamber 42 when the igniter 50 is activated. Hooked arms 60 are mounted on the actuator 52 and biased outward toward respective adjacent walls 43A, 43B by torsion springs 62 or by other suitable biasing means. When the actuator 56 moves to the deployed position, the arms 60 engage teeth 64 secured to the housing 40 to lock the actuator 56 in the deployed position, preventing return of the actuator 56 to the undeployed position. The arms 60 deflect inward when traveling forward over the nearest teeth 64, but cannot travel rearward, unless manually manipulated, and thereby become locked to the teeth 64.

The actuator 56 includes a ram portion 59 with the load-bearing component 32 connected at a forward end of the ram portion 59 so that the load-bearing component 32 is positioned as an end effector of the actuator 56. The load-bearing component 32 moves with the actuator 56 by translating forward into the wheel cavity 24 in response to the pressure impulse and engages the tire and wheel assembly 19 as shown in FIG. 3. As discussed herein, the tire 20 may rupture, and is therefore not shown in FIG. 3. Accordingly, the load-bearing component 32 may contact the wheel 22 of the tire and wheel assembly 19.

The load-bearing component 32 has a forward facing surface 66 with a shape configured to receive the tire and wheel assembly 19 and limit its further rearward movement, so that, for example, the tire and wheel assembly 19 does not move past the line 34. As shown in FIG. 10, the nonstructural wheelhouse liner 28 covers the load-bearing component 32 of the actuator 56. Because the wheelhouse liner 28 is nonstructural, it is comprised of a material configured to separate from the wheelhouse structure 26 when the actuator 56 deploys, allowing the actuator 56 to move forward into engagement with the tire and wheel assembly 19. An alternative wheelhouse liner 28A could be configured with an opening 65, to abut and surround the load-bearing component 32 at the opening 65, as indicated in phantom in FIG. 9.

Figure 11:
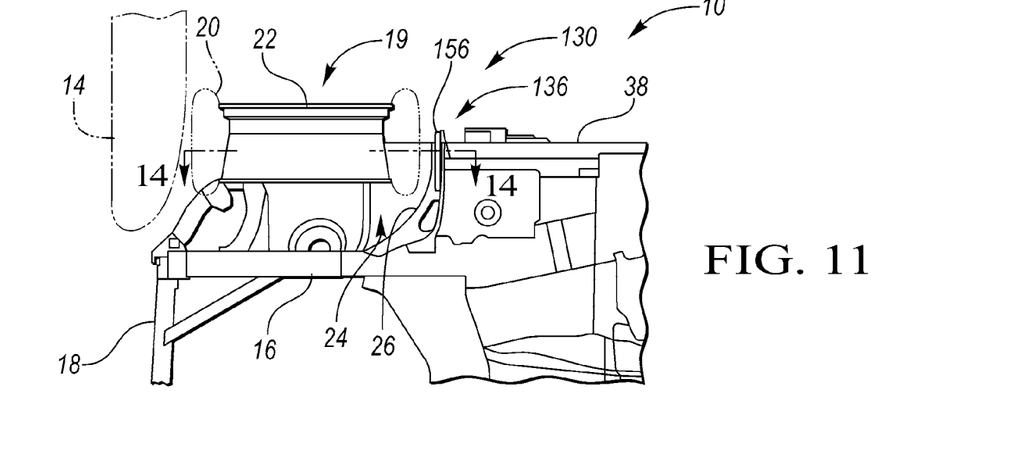
FIG. 11 is a schematic illustration in fragmentary bottom view of the vehicle and barrier of FIG. 1 with an alternative embodiment of an actuator assembly with a load-bearing component in an unactuated position.

FIGS. 11-16 show another embodiment of an energy management system 130 for the vehicle 10. In FIG. 11, the tire 20 is shown only in phantom, and is not shown in FIG. 12, to represent that, under a sufficient magnitude of the load F, the tire 20 may puncture. In order to limit movement of the tire and wheel assembly 19 within the wheel cavity 24 under loading by load F, the energy management system 130 includes a load-bearing component 132 operatively positioned in the wheel cavity 24 rearward of the tire and wheel assembly 19. The load-bearing component 132 is configured to limit movement of the tire and wheel assembly 19 in the wheel cavity 24 under the load F, such as but not limited to by limiting movement of the tire and wheel assembly 19 rearward of the wheelhouse structure 26 under the load F. For example, the energy management system 30 with the load-bearing component 132 limits movement of the tire and wheel assembly 19 rearward of line 34 shown in FIG. 12.

In the embodiment of FIGS. 11-16, the energy management system 130 includes an airbag assembly 136 mounted to the rocker 38. The airbag assembly 136 includes an airbag 156, and the load-bearing component 132 is also referred to as a first portion of the airbag 156. More specifically, with reference to FIGS. 14-16, the airbag assembly 136 includes an actuator housing 140, which may also be referred to as an inflator cylinder. The actuator housing 140 forms an inflation chamber 142. The airbag 156 is operatively connected to a wheelhouse structure 126. The airbag 156 also includes a second portion, which is a flexible, expandable portion 157. The second portion 157 expands from a collapsed state (i.e., an unactuated or uninflated state) shown in FIGS. 11 and 14-16 to an expanded state (i.e., an actuated or inflated state) shown in FIG. 12 when the airbag 156 is inflated. The expandable portion 157 can be a variety of materials, such as but not limited to a thermoplastic olefin, or chlorosulfonated polyethylene (CSPE) synthetic rubber (CSM), such as HYPALON, sandwiched with a nylon scrim fabric. The load-bearing component 132 is bonded to the expandable portion 157 and is a relatively tough material providing a reaction surface 166 that engages the tire and wheel assembly 19. The load-bearing component 132 may be flexible, but less so than the expandable portion 157 for increased toughness. For example, the load-bearing component 132 may be configured to withstand 10-100 kilojoules per meters squared ($KJ/m^2$). The load-bearing component 132 may have a flexural strength of approximately 50 megapascals (Mpa) and a flexibility in the range of 1-3 gigapascals (Gpa). Nonlimiting examples of suitable materials for the load-bearing component 132 include a high density or cross-linked polyethylene, polyurethane, oriented polypropylene, reinforced nylon, and flexible polyvinyl chloride (PVC). The load-bearing component 132 can be bonded to the expandable portion 157 of the air bag 156 by an industrial adhesive, by vibration welding, by hot plate welding, or other suitable means.

Figure 16:
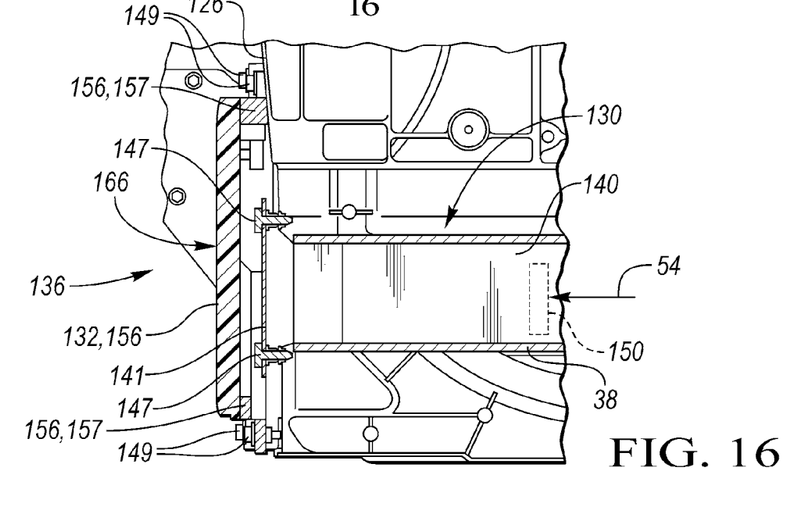
FIG. 16 is a schematic illustration in fragmentary cross-sectional view of the portion of the vehicle of FIG. 15 taken at lines 16-16 in FIG. 15.

A chute 141 is mounted to the actuator housing 140. As shown in FIG. 16, the chute 141 is connected to the housing 140, such as by welding. The combined chute 141 and actuator housing 140 are then attached to the wheelhouse structure 126 by fasteners 147 that may include studs and nuts. Fasteners 147 would also attach the airbag 156 gas chamber opening to the chute 141 and the wheel house structure 126. The expandable portion 157 of the air bag 156 is also secured to the wheelhouse structure 126 with fasteners 149 so that the airbag 156 surrounds the chute 141. An inflation mechanism 150 shown in hidden lines in FIG. 16 is mounted in the actuator housing 140 in communication with the inflation chamber 142 and is selectively activatable to release propellant that inflates the airbag 156. For example, the sensor 52 of FIG. 1 is mounted in the vehicle 10 or otherwise operatively connected to the vehicle 10, and is operatively connected to the airbag 156, via the inflation mechanism 150. The sensor signal 54 activates the inflation mechanism 150 upon sensing a predetermined condition indicative of imminent or actual application of the load as discussed above. The inflation mechanism 150 can release a stored gas propellant or activate a gas-generating solid propellant into the airbag 156 via the housing 140 and the chute 141 so that the expandable portion 157 of the airbag 156 inflates (i.e., deploys and expands), extending from the position shown in FIGS. 11 and 16 into the wheel cavity 24, as shown in FIG. 12, causing the load-bearing component 132 to engage the tire and wheel assembly 19 to limit movement of the tire and wheel assembly 19 within the wheel cavity 19, such as but not limited to limiting rearward movement of the tire and wheel assembly 19.

Figure 12:
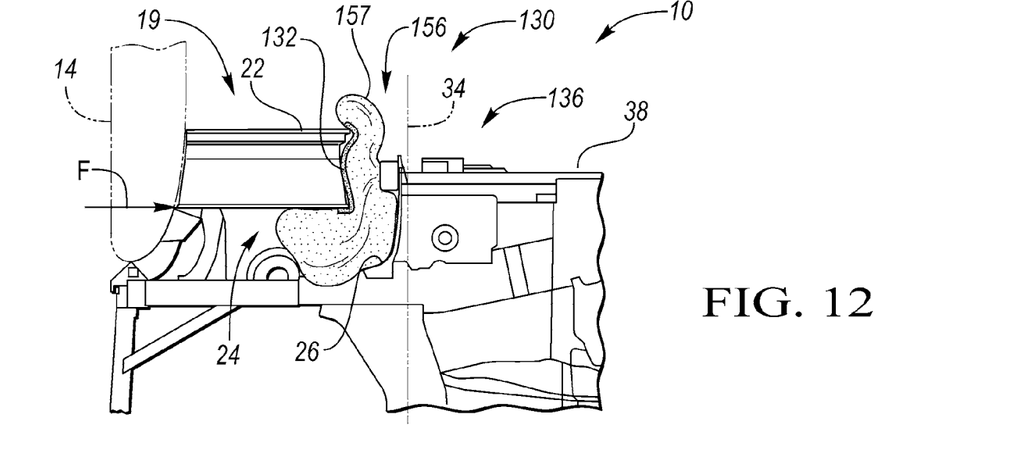
FIG. 12 is a schematic illustration in fragmentary bottom view of the vehicle and barrier of FIG. 11 with an air bag of the actuator assembly inflated.
Figure 13:
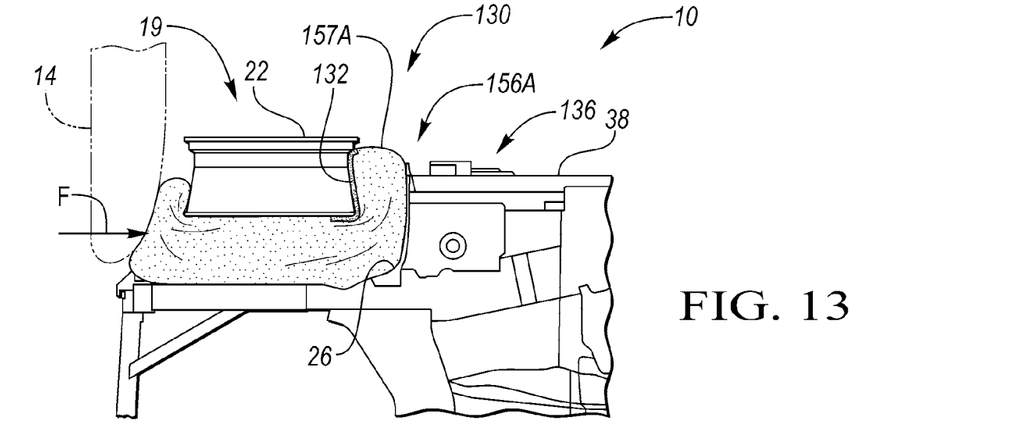
FIG. 13 is a schematic illustration in fragmentary bottom view of the vehicle and barrier of FIG. 11 with an alternative embodiment of an air bag of the actuator assembly inflated.

FIG. 12 shows the airbag 156 deployed when the application of the load F to the vehicle 10 is imminent or is applied. In FIG. 12, the deployed airbag 156 is mainly rearward and inward of the tire and wheel assembly 19 in the wheel cavity 24. FIG. 13 shows an embodiment of an airbag 156A alike in all aspects to airbag 156 except that the expandable portion 157A is configured to expand to wrap around the tire and wheel assembly 19 rearward, inward, and forward of the tire and wheel assembly 19 when the airbag 156A is deployed. The wheelhouse structure 26 provides a reaction surface for the airbag 156 or 156A, as shown in FIGS. 12 and 13. The airbag 156 and the airbag 156A stabilize the tire and wheel assembly 19, thereby limiting movement of the tire and wheel assembly 19 within the wheel cavity 24, such as by substantially preventing rearward translation such as beyond the line 34. The propellant used in the airbag 156, 156A may be a solid propellant which may provide further load-bearing capability and ability to stabilize the tire and wheel assembly 19 by providing a larger output per unit size of the actuator assembly (as opposed to a stored gas system which typically requires a larger actuator). Additionally, the propellant could be an expanding liquid or semi-solid material formed through a chemical reaction. This material may remain in a liquid or semi-solid state throughout the event or could harden upon cooling during deployment.

Figure 17:
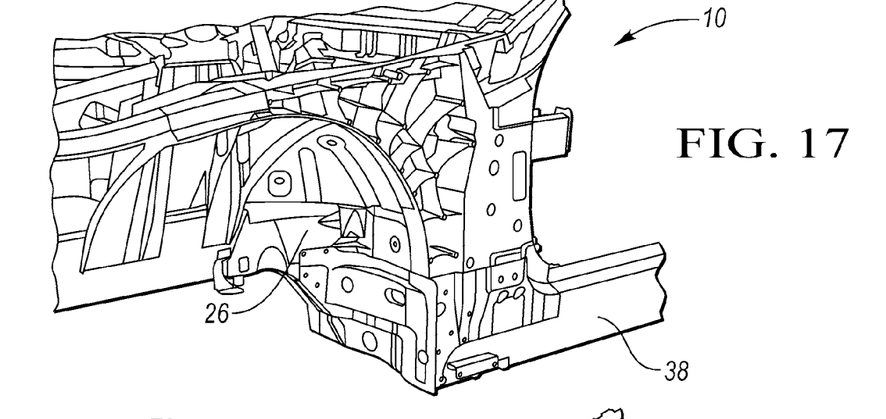
FIG. 17 is a schematic illustration in fragmentary perspective view of a portion of the vehicle of FIG. 1.
Figure 18:
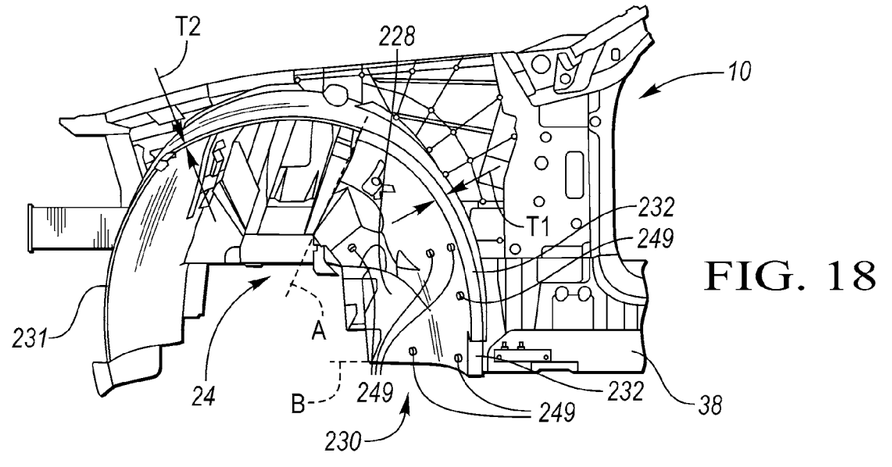
FIG. 18 is a schematic illustration in fragmentary side view of the portion of the vehicle of FIG. 17 with a wheelhouse liner including an alternative embodiment of a load-bearing component in accordance with an alternative aspect of the present teachings.

FIG. 17 shows the wheelhouse structure 26 of the vehicle 10, and FIG. 18 shows an alternative embodiment of an energy management system 230 for the vehicle 10. The energy management system 230 includes a structural wheelhouse liner 228 that is configured to secure to the wheelhouse structure 26 with a plurality of fasteners 249, such as bolts so that the structural wheelhouse liner 228 lines the wheel cavity 24. Alternatively, the structural wheelhouse liner 228 could be welded to the wheelhouse structure 26, such as if the structural wheelhouse liner 228 is a high strength steel or other material conducive to welding.

Figure 19:
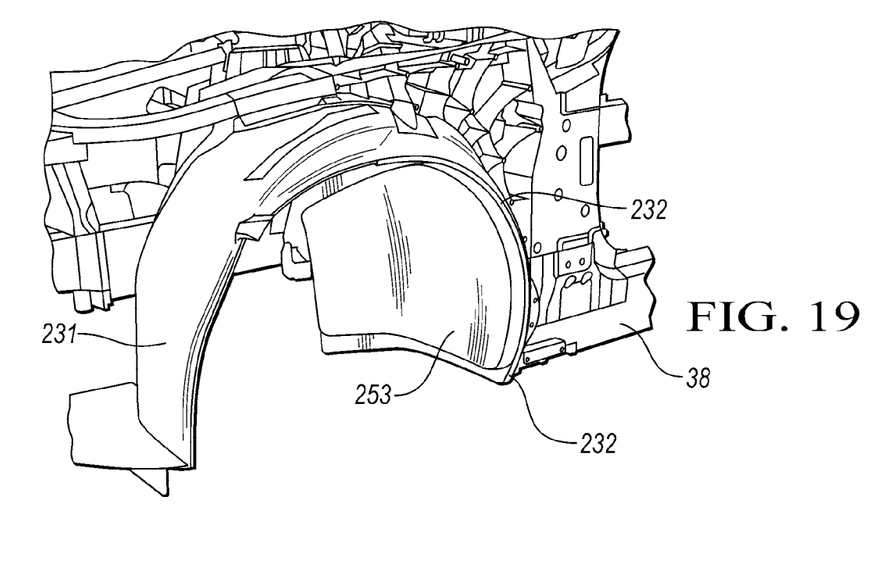
FIG. 19 is a schematic illustration in fragmentary perspective view of the portion of the vehicle of FIG. 18 with the wheelhouse liner including the load-bearing component and an optional damping pad.

The structural wheelhouse liner 228 includes a portion that is a load-bearing component 232 that is indicated by the greater thickness T1 of the structural wheelhouse liner 228. The load-bearing component 232 extends from about line A to about line B. The remainder of the structural wheelhouse liner 228 forward of line A is indicated as portion 231. Portion 231 is of a relatively smaller thickness T2, commensurate with a traditional wheelhouse liner not configured to serve a load-bearing function. For example, the portion that is the load-bearing component 232 may be made from a fiber-reinforced composite such as with carbon fiber, Kevlar, or glass fiber. In another alternative, the load-bearing component 232 may be a high strength steel. Still further, the entire structural wheelhouse liner 228 could serve as a load-bearing component if it is all of the material of the load-bearing component 232 and all has at least a thickness T1. Optionally, a damping pad 253 can be secured to the load-bearing component between the tire and wheel assembly 19 and the load-bearing component 232 as shown in FIG. 9. The portion 231 can be a polymeric material, or can be the same material as the load-bearing component, but of a lesser thickness as discussed.

Figure 20:
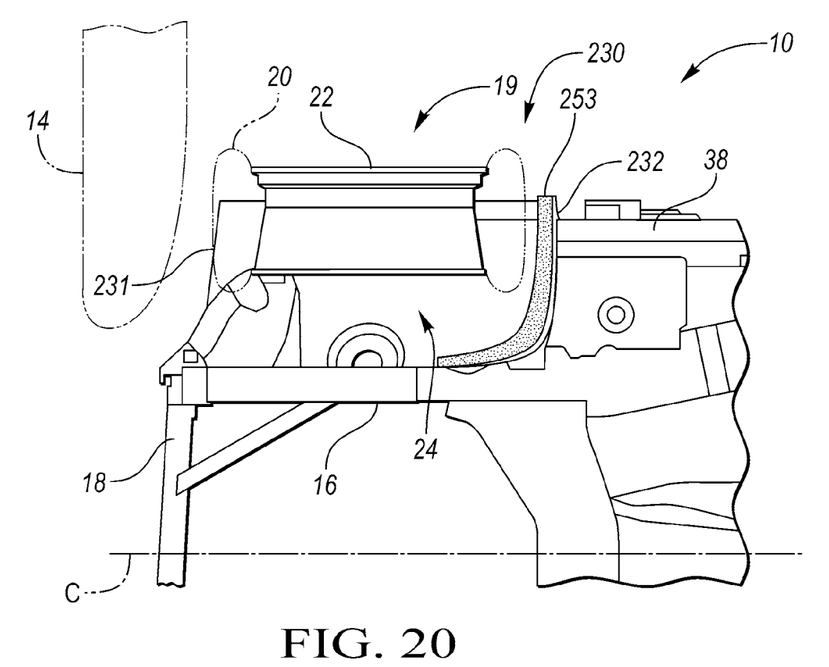
FIG. 20 is a schematic illustration in fragmentary bottom view of the vehicle of FIG. 19 and the barrier of FIG. 1 prior to engagement of the barrier with the vehicle.
Figure 21:
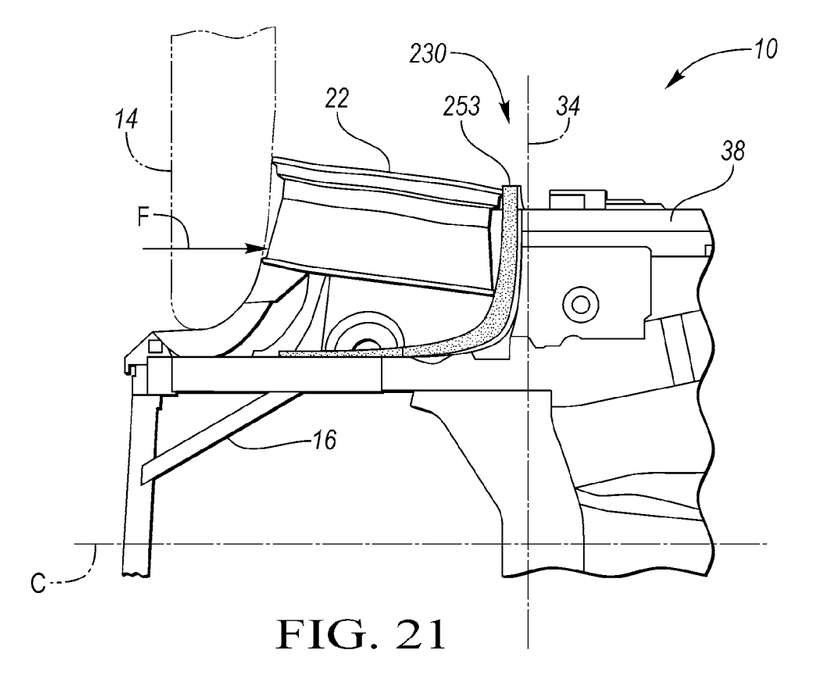
FIG. 21 is a schematic illustration in fragmentary bottom view of the vehicle and the barrier of FIG. 20 following engagement of the barrier with the vehicle.

In FIG. 20, the tire 20 is shown only in phantom, and is not shown in FIG. 21, to represent that, under a sufficient magnitude of the load F, the tire 20 may puncture. In order to limit movement of the tire and wheel assembly 19 within the wheel cavity 24 under loading by load F, the energy management system 230 includes the load-bearing component 232 operatively positioned in the wheel cavity 24 rearward of the tire and wheel assembly 19. The load-bearing component 232 is configured to limit movement of the tire and wheel assembly 19 in the wheel cavity 24, such as by limiting movement of the tire and wheel assembly 19 rearward of the wheelhouse structure 26 under the load F. For example, the energy management system 230 with the load-bearing component 232 limits movement of the tire and wheel assembly 19 rearward of line 34 shown in FIG. 21. As is apparent in FIG. 21, the load-bearing component 232 catches the tire and wheel assembly 19 and stops its rearward movement. By configuring the structural wheelhouse liner 228 as described, the structural wheelhouse liner 228 serves the traditional purpose of a wheelhouse liner, in lining the wheelhouse structure 26 for aesthetics, and also serves the load-bearing function described. Because the structural wheelhouse liner 228 is passive, no sensors of ignition mechanisms are required.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An energy management system for a vehicle, wherein the vehicle has a wheelhouse structure defining a wheel cavity, and a tire and wheel assembly in the wheel cavity, the energy management system comprising:
   a load-bearing component operatively positioned in the wheel cavity rearward of the tire and wheel assembly and configured to limit movement of the tire and wheel assembly within the wheel cavity under a predetermined load that is applied to the vehicle forward of the tire and wheel assembly and offset from a longitudinal centerline of the vehicle;
   an airbag assembly mounted to the vehicle and including an airbag selectively deployable into the wheel cavity; wherein a first portion of the airbag is the load-bearing component;
   wherein the vehicle has a longitudinally-extending rocker; and wherein the airbag assembly is mounted within the rocker.

2. The energy management system of claim 1, the airbag assembly further comprising:
   an actuator housing forming an inflation chamber;
   wherein the airbag is operatively connected to the actuator housing;
   an inflation mechanism in communication with the inflation chamber and selectively activatable to inflate the airbag;
   wherein the airbag is configured to deploy into the wheel cavity when inflated so that the load-bearing component engages the tire and wheel assembly; and
   a sensor operatively connected to the vehicle and to the airbag and configured to activate the inflation mechanism upon sensing a predetermined condition indicative of imminent or actual application of the load.

3. An energy management system for a vehicle, wherein the vehicle has a wheelhouse structure defining a wheel cavity, and a tire and wheel assembly in the wheel cavity, the energy management system comprising:
   a load-bearing component operatively positioned in the wheel cavity rearward of the tire and wheel assembly and configured to limit movement of the tire and wheel assembly within the wheel cavity under a predetermined load that is applied to the vehicle forward of the tire and wheel assembly and offset from a longitudinal centerline of the vehicle;
   an airbag assembly mounted to the vehicle and including an airbag selectively deployable into the wheel cavity; and wherein a first portion of the airbag is the load-bearing component;

wherein the vehicle has a longitudinally-extending rocker, wherein the airbag assembly is mounted to the rocker, and the airbag assembly further comprising:
an actuator housing forming an inflation chamber;
wherein the airbag is operatively connected to the actuator housing;
an inflation mechanism in communication with the inflation chamber and selectively activatable to inflate the airbag;
wherein the airbag is configured to deploy into the wheel cavity when inflated so that the load-bearing component engages the tire and wheel assembly;
a sensor operatively connected to the vehicle and to the airbag and configured to activate the inflation mechanism upon sensing a predetermined condition indicative of imminent or actual application of the load; and
wherein the airbag is mounted to the wheelhouse structure and the actuator housing is within the rocker.

4. The energy management system of claim 3, wherein a second portion of the airbag is expandable and collapsible and is bonded to the first portion of the airbag, and wherein said second portion moves from a collapsed state to an expanded state when the airbag is inflated.

5. The energy management system of claim 3, wherein the airbag is configured to wrap around the tire and wheel assembly rearward, inward, and forward of the tire and wheel assembly when the airbag is deployed.

6. An energy management system for a vehicle, wherein the vehicle has a wheelhouse structure defining a wheel cavity, and a tire and wheel assembly in the wheel cavity, the energy management system comprising:
a selectively actuatable assembly including a load-bearing component operatively positioned in the wheel cavity rearward of the tire and wheel assembly and configured to translate forward when the assembly is actuated to thereby limit movement of the tire and wheel assembly in the wheel cavity under a load that is applied to the vehicle forward of the tire and wheel assembly and offset from a longitudinal centerline of the vehicle;
wherein the selectively actuatable assembly is an airbag assembly mounted to the vehicle and including an airbag selectively deployable into the wheel cavity;
wherein the load-bearing component is a first portion of the airbag; and
wherein the vehicle has a longitudinally-extending rocker, wherein the airbag assembly is mounted within the rocker.

7. The energy management system of claim 6, the airbag assembly further comprising:
an actuator housing forming an inflation chamber;
wherein the airbag is operatively connected to the actuator housing;
an inflation mechanism in communication with the inflation chamber and selectively activatable to release solid propellant that inflates the airbag;
wherein the airbag is configured to deploy into the wheel cavity when inflated so that the load-bearing component engages the tire and wheel assembly; and
a sensor operatively connected to the vehicle and to the airbag and configured to activate the inflation mechanism upon sensing a predetermined condition indicative of imminent or actual application of the load.

8. The energy management system of claim 6, wherein a second portion of the airbag is expandable and collapsible and is bonded to the first portion of the airbag; and wherein said second portion moves from a collapsed state to an expanded state when the airbag is inflated.

9. A vehicle comprising:
a wheelhouse structure defining a wheel cavity;
a tire and wheel assembly in the wheel cavity;
an energy management system including a load-bearing component operatively positioned in the wheel cavity rearward of the tire and wheel assembly and configured to limit movement of the tire and wheel assembly in the wheel cavity under a load that is applied to the vehicle forward of the tire and wheel assembly and offset from a longitudinal centerline of the vehicle;
an airbag assembly mounted to the vehicle and including an airbag selectively deployable into the wheel cavity;
wherein a first portion of the airbag is the load-bearing component; and
wherein the vehicle has a longitudinally-extending rocker, wherein the airbag assembly is mounted within the rocker.

* * * * *